United States Patent
Kanai

(10) Patent No.: US 11,683,424 B2
(45) Date of Patent: Jun. 20, 2023

(54) PRINTING APPARATUS THAT DISPLAYS A DETERMINED PLURALITY OF SETS OF IMAGE DATA, A METHOD OF CONTROLLING THE PRINTING APPARATUS, AND A NON-TRANSITORY COMPUTER-READABLE STORAGE MEDIUM

(71) Applicant: CANON KABUSHIKI KAISHA, Tokyo (JP)

(72) Inventor: Yasunori Kanai, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/360,832

(22) Filed: Mar. 21, 2019

(65) Prior Publication Data
US 2019/0222704 A1 Jul. 18, 2019

Related U.S. Application Data

(63) Continuation of application No. 15/262,424, filed on Sep. 12, 2016, now abandoned.

(30) Foreign Application Priority Data

Sep. 30, 2015 (JP) .............................. JP2015-194400

(51) Int. Cl.
*H04N 1/00* (2006.01)
(52) U.S. Cl.
CPC ..... *H04N 1/00456* (2013.01); *H04N 1/00411* (2013.01); *H04N 1/00466* (2013.01); *H04N 1/00482* (2013.01); *H04N 2201/0094* (2013.01)

(58) Field of Classification Search
None
See application file for complete search history.

(56) References Cited

U.S. PATENT DOCUMENTS 5,841,548 A * 11/1998 Mitome ............ H04N 1/00567
399/83
5,987,227 A * 11/1999 Endo .................... H04N 1/0005
358/468

(Continued)

FOREIGN PATENT DOCUMENTS

JP H11-165455 * 6/1999
JP H11-165455 A 6/1999

(Continued)

OTHER PUBLICATIONS

Office Action dated Jun. 28, 2019, issued in Japanese Patent Application No. 2015-194400.

(Continued)

*Primary Examiner* — Miya J Williams
*Assistant Examiner* — Pawan Dhingra
(74) *Attorney, Agent, or Firm* — Venable LLP

(57) ABSTRACT

A printing apparatus that prints an image on a sheet includes at least one memory that stores a set of instructions, and at least one processor that executes instructions, of the set of instructions, to cause the printing apparatus to perform operations including receiving a print job for instructing printing of a plurality of pages, in which a plurality of copies, each including one or more pages, is included, determining a number of copies based on a number of pages in the plurality of pages and attribution information indicating a number of pages per a set of pages to be printed, and displaying a screen that includes information indicating the determined number of copies.

10 Claims, 13 Drawing Sheets

(56) References Cited

U.S. PATENT DOCUMENTS

| | | | |
|---|---|---|---|
| 6,927,865 B1* | 8/2005 | Kujirai | G06F 3/1256 358/1.12 |
| 6,943,903 B2 | 9/2005 | Simpson et al. | |
| 7,535,591 B2* | 5/2009 | Kujirai | G06F 3/125 358/1.9 |
| 7,764,394 B2 | 7/2010 | Omura | |
| 7,933,035 B2* | 4/2011 | Okada | H04N 1/2392 270/58.11 |
| 8,274,671 B2 | 9/2012 | Kanai | |
| 8,699,041 B2 | 4/2014 | Kanai | |
| 8,823,975 B2* | 9/2014 | Uchida | G03G 15/5087 358/1.14 |
| 8,913,278 B2* | 12/2014 | Tsunekawa | H04N 1/00442 358/1.6 |
| 2002/0026453 A1* | 2/2002 | Mori | G06K 15/02 |
| 2002/0135798 A1 | 9/2002 | Simpson et al. | |
| 2003/0030846 A1* | 2/2003 | Mori | H04N 1/00408 358/400 |
| 2003/0112464 A1* | 6/2003 | Garcia | G06F 3/1288 358/1.15 |
| 2003/0206315 A1* | 11/2003 | Lester | G06F 3/1204 358/1.16 |
| 2005/0185204 A1* | 8/2005 | Shelton | H04N 1/00137 358/1.18 |
| 2005/0286078 A1* | 12/2005 | Maruyama | H04N 1/32635 358/1.15 |
| 2006/0139679 A1* | 6/2006 | Barry | G06K 15/1857 358/1.13 |
| 2007/0002377 A1* | 1/2007 | Tokunaga | G06F 40/103 358/1.18 |
| 2008/0151300 A1* | 6/2008 | Kowaka | H04N 1/00448 358/1.15 |
| 2009/0175505 A1* | 7/2009 | Muquit | G06F 21/32 382/115 |
| 2010/0079802 A1* | 4/2010 | Kanai | G06F 3/1285 358/1.15 |
| 2010/0302567 A1* | 12/2010 | Ozaki | G06F 3/1253 358/1.9 |
| 2011/0134442 A1* | 6/2011 | Mori | G03G 21/02 358/1.14 |
| 2012/0099128 A1* | 4/2012 | Yoshida | H04N 1/00448 358/1.13 |
| 2012/0194861 A1* | 8/2012 | Miyaguchi | G06F 3/1288 358/1.15 |
| 2012/0224204 A1* | 9/2012 | Yamagishi | G06K 15/4065 358/1.13 |
| 2013/0061134 A1* | 3/2013 | Maehira | G06F 3/1285 715/251 |
| 2014/0068454 A1 | 3/2014 | Hirama et al. | |
| 2014/0368869 A1* | 12/2014 | Park | G06F 3/1208 358/1.18 |
| 2015/0339553 A1 | 11/2015 | Robinson et al. | |
| 2016/0034228 A1* | 2/2016 | Kaneko | G06F 3/1204 358/1.14 |
| 2016/0103638 A1* | 4/2016 | Fukunaga | G06F 3/1211 358/1.15 |
| 2016/0210093 A1 | 7/2016 | Kanai | |
| 2017/0255428 A1* | 9/2017 | Suzuki | H04N 1/00458 |
| 2019/0317702 A1* | 10/2019 | Kaneda | G06F 3/1285 |

FOREIGN PATENT DOCUMENTS

| | | |
|---|---|---|
| JP | 2004-013204 A | 1/2004 |
| JP | 2004-192395 A | 7/2004 |
| JP | 2012-106453 A | 6/2012 |
| JP | 2013-107257 A | 6/2013 |
| JP | 2014-048891 A | 3/2014 |
| JP | 2015-039864 A | 3/2015 |
| JP | 2015-039864 * | 5/2015 |

OTHER PUBLICATIONS

English-language machine translation of Japanese Patent Document No. 2015-039864.

* cited by examiner

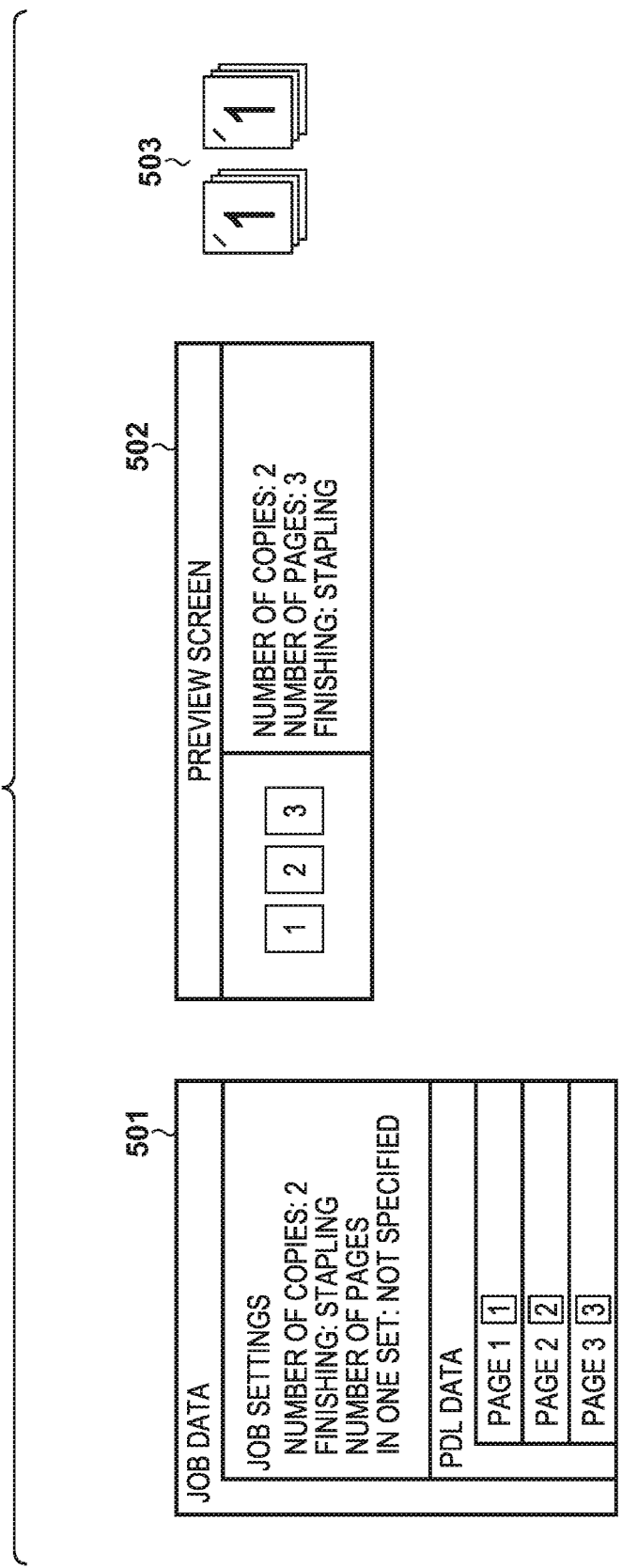

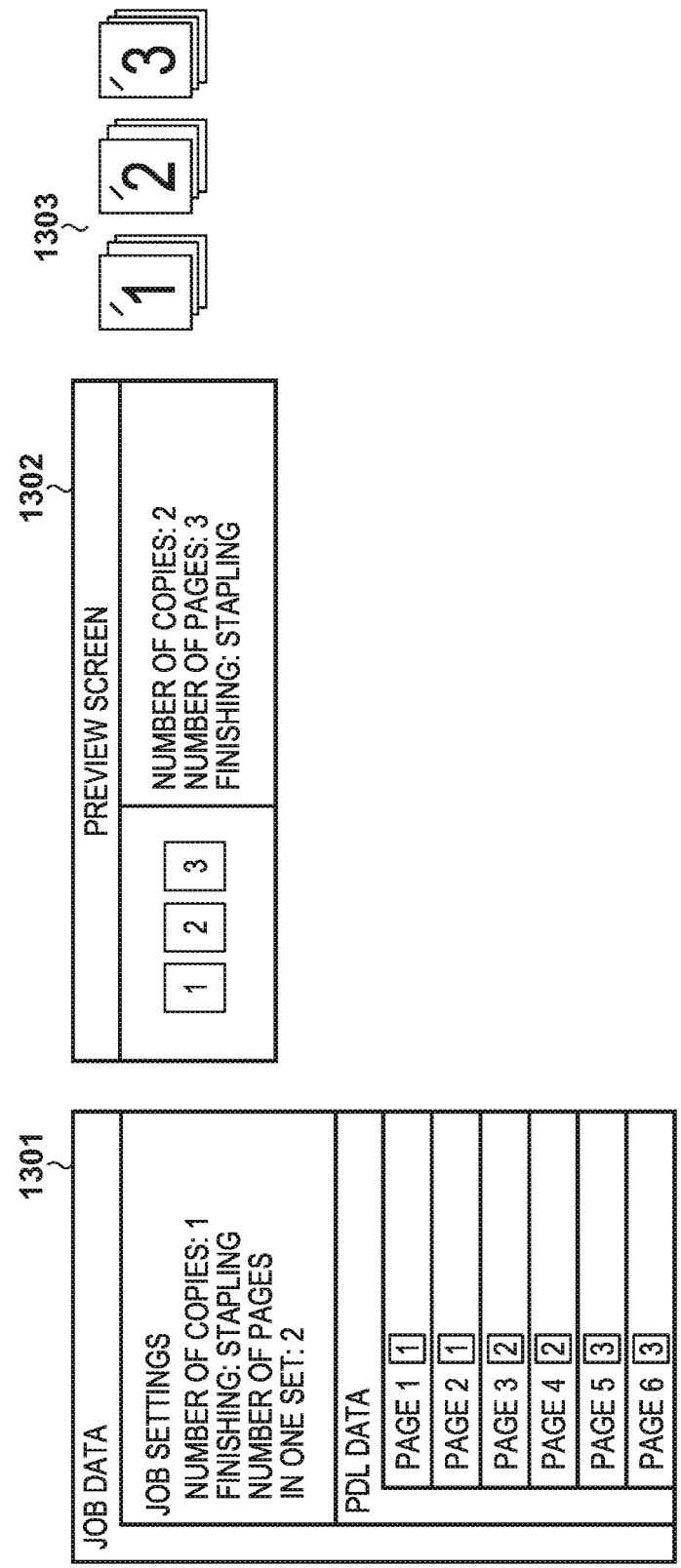

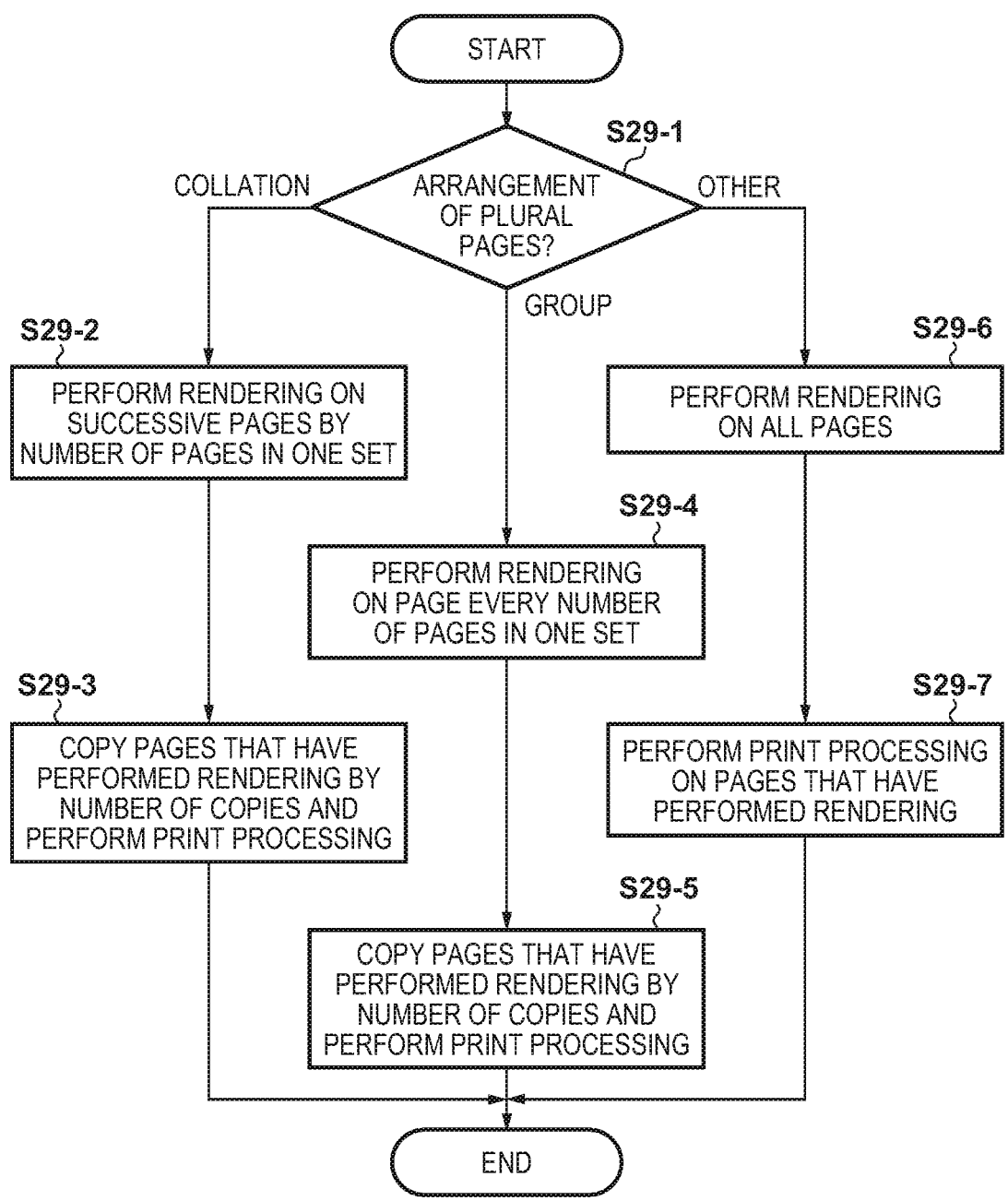

PRINTING APPARATUS THAT DISPLAYS A DETERMINED PLURALITY OF SETS OF IMAGE DATA, A METHOD OF CONTROLLING THE PRINTING APPARATUS, AND A NON-TRANSITORY COMPUTER-READABLE STORAGE MEDIUM

This application is a continuation application of U.S. patent application Ser. No. 15/262,424, filed Sep. 12, 2016, which claims the benefit of Japanese Patent Application No. 2015-194400, filed on Sep. 30, 2015, both of which are hereby incorporated by reference herein in their entireties.

BACKGROUND OF THE INVENTION

Field of the Invention

The present invention relates to a printing apparatus, a control method thereof, and a storage medium.

Description of the Related Art

A recent printing apparatus, such as a copying machine or a multifunction peripheral, includes a preview screen for checking print contents in advance (see Japanese Patent Laid-Open No. 2015-39846). For example, printing contents, such as an image on each page of a print target, the number of copies, and the number of pages, can be displayed on the preview screen.

When a plurality of copies of each page of the print target are printed, copy processing may be performed in a host terminal. In this case, the plurality of pages are generated by the copy processing in the host terminal, and a print job for instructing to print the plurality of pages is transmitted from the host terminal to the printing apparatus. In such a print job, however, for example, print contents, such as an image on each page in one copy, the number of pages in one copy, and the number of copies, may not be displayed on the preview screen correctly. That is, the print contents displayed on the preview screen and an actual print result may be different from each other.

SUMMARY OF THE INVENTION

The present invention provides, for example, a printing apparatus advantageous in displaying print contents on a preview screen correctly.

According to one aspect, the present invention provides a printing apparatus that prints an image on a sheet, the apparatus comprising a reception unit configured to receive a print job for instructing to print a plurality of pages consisting of a plurality of copies, each of which has not less than one page, and a display unit configured to display print contents on a screen based on the print job received by the reception unit, wherein, in a case in which the print job contains information indicating the number of pages in one set that should perform finishing processing, the display unit determines the number of copies based on the information and the number of pages in the plurality of pages, and displays, on the screen, the determined number of copies and a preview image on each page in one copy as the print contents.

Further features of the present invention will become apparent from the following description of exemplary embodiments with reference to the attached drawings.

BRIEF DESCRIPTION OF THE DRAWINGS

FIG. 5A shows views for explaining a general preview in a case in which the printing apparatus performs copy processing.

FIG. 13A shows views showing job data, print contents displayed on a preview screen, and a print result.

FIG. 14 is a flowchart showing print processing.

DESCRIPTION OF THE EMBODIMENTS

Figure 1:
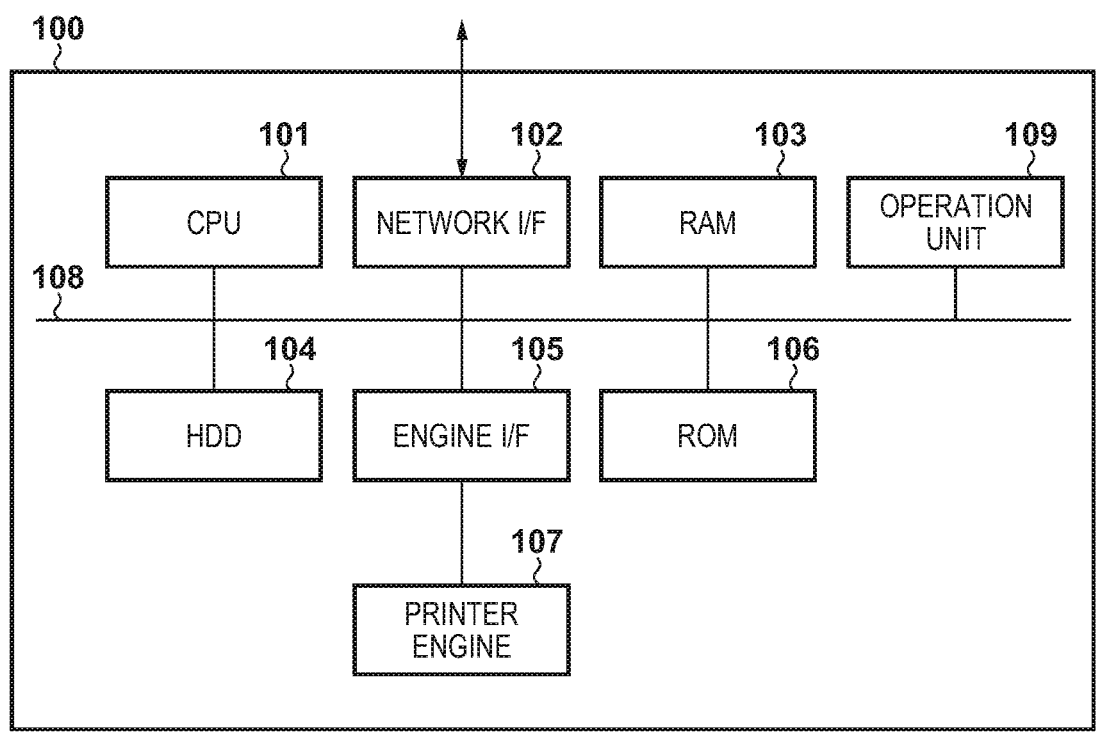
FIG. 1 is a block diagram showing an example of a hardware arrangement of a printing apparatus.

Exemplary embodiments of the present invention will be described below with reference to the accompanying drawings. Note that the same reference numerals denote the same members throughout the drawings, and a repetitive description thereof will not be given.

First Embodiment

A printing apparatus 100 according to the first embodiment will be described. First, the apparatus arrangement of the printing apparatus 100 according to the first embodiment will be described with reference to FIG. 1. FIG. 1 is a block diagram showing an example of the hardware arrangement of the printing apparatus 100.

A central processing unit (CPU) 101 controls respective units of the printing apparatus 100 via a system bus 108 and executes programs stored in a storage device. For example, the CPU 101 implements the function (software arrangement) of the printing apparatus 100 and a process according to each flowchart to be described later by executing programs stored in a hard disk drive (HDD) 104.

A random-access memory (RAM) 103 can be utilized as a temporary storage area and a work memory in a print operation of the printing apparatus 100. The HDD 104 can be a mass storage device and can store various control programs executed by the CPU 101. The HDD 104 can also be utilized as, for example, a temporary storage area of data to be processed or a save area of accumulated print data. A read only memory (ROM) 106 is a storage device that stores an activation processing program of the printing apparatus 100. Note that each of the RAM 103, the HDD 104, and the ROM 106 is an example of a storage unit.

A network interface (I/F) is an interface that performs communication with another apparatus, such as a host terminal (host computer), via an external network. An engine I/F communicates with a printer engine 107 and controls the printer engine 107. The printer engine 107 performs a process of printing (performs print processing) an image on a sheet by using, for example, electrophotography or an inkjet image forming technique, and performs finishing processing (such as stapling).

An operation unit 109 is a user interface capable of displaying a state of the printing apparatus 100 or accepting an input related to an instruction from a user for the printing apparatus 100. The operation unit 109 includes a screen (preview screen) for checking print contents in advance. For example, printing contents, such as an image on each page of a print target, the number of copies, and the number of pages can be displayed on the preview screen. The preview screen may also include, for example, a touch panel, or the like, such that the user inputs the instruction.

Figure 2:
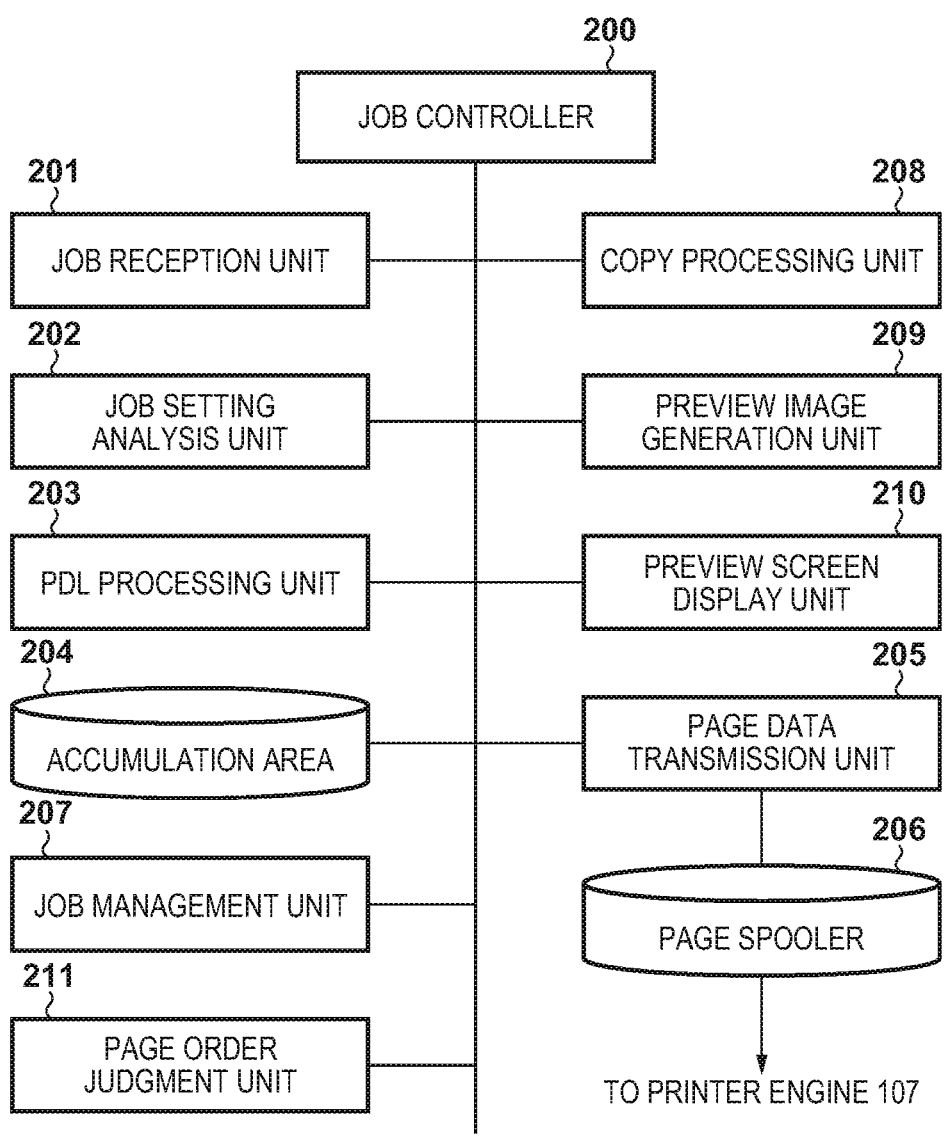
FIG. 2 is a view showing an example of the arrangement of software modules of the printing apparatus.

The software arrangement, or the like, of the printing apparatus 100 will now be described with reference to FIG. 2. FIG. 2 is a view showing an example of the arrangement of software modules of the printing apparatus 100. Each software module can be implemented by, for example, causing the CPU 101 to load programs stored in the HDD 104 or the ROM 106 into the RAM 103 and to execute the programs.

A job controller 200 systematically controls other respective software modules and plays a main role of control. A job reception unit 201 receives the print job from the host terminal via a network I/F 102 and saves the print job in an accumulation area 204. Note that the accumulation area 204 may be provided in the RAM 103 or may be provided in the HDD 104.

A job setting analysis unit 202 analyzes the received print job and notifies a job management unit 207 of this. The job management unit 207 manages, for each of a plurality of print jobs saved in the accumulation area 204, job settings, job data, page data, and preview images. A page description language (PDL) processing unit 203 analyzes PDL data contained in the received print job for each page and performs rendering in accordance with the job settings, thereby generating page data. The generated page data is saved in the accumulation area 204.

A page data transmission unit 205 saves page data saved in the accumulation area 204 in a page spooler 206 and transmits the saved page data to the printer engine 107. Note that the page data transmission unit 205 may be configured to transmit the page data to the printer engine 107 directly without going through the page spooler 206. The page spooler 206 may be provided in the RAM 103 or may be provided in the HDD 104.

A copy processing unit 208 performs a process of copying each page in the PDL data of the print job when a value of two or more is set for the number of copies setting in the job settings. A preview image generation unit 209 generates a preview image for each page in the PDL data of the received print job and stores the preview image in the accumulation area 204. A preview screen display unit 210 displays (previews), on a preview screen of the operation unit 109, the job settings (such as the number of copies) analyzed in the job setting analysis unit 202, and a preview image on each page generated in the preview image generation unit 209. A page order judgment unit 211 judges the arrangement type of a plurality of pages in the PDL data of the received print job.

For example, the page order judgment unit 211 judges whether the arrangement of the plurality of pages in the PDL data is the arrangement for performing collation printing, the arrangement for performing group printing, or the arrangement for performing another type of printing.

Figure 3:
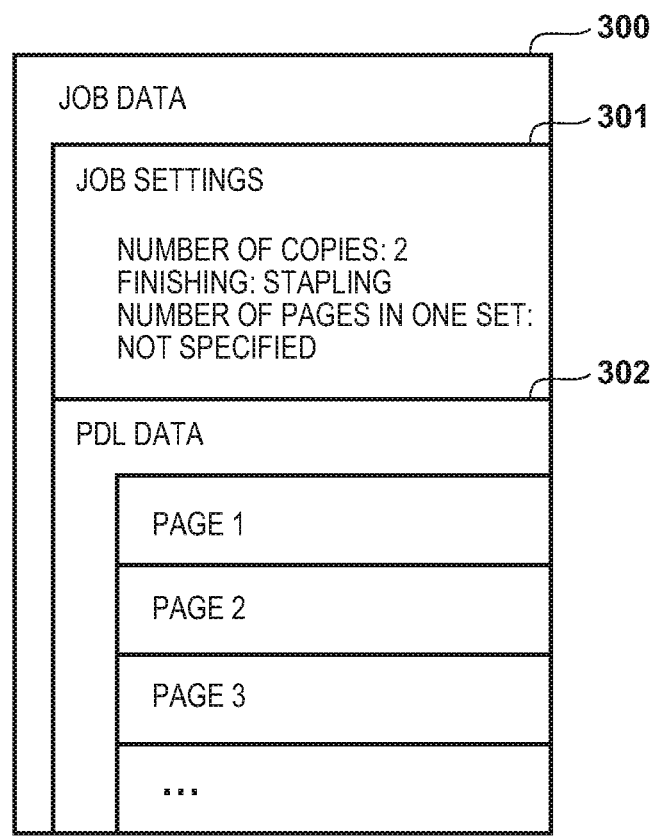
FIG. 3 is a view for explaining an arrangement of job data of a print job.
Figure 4:
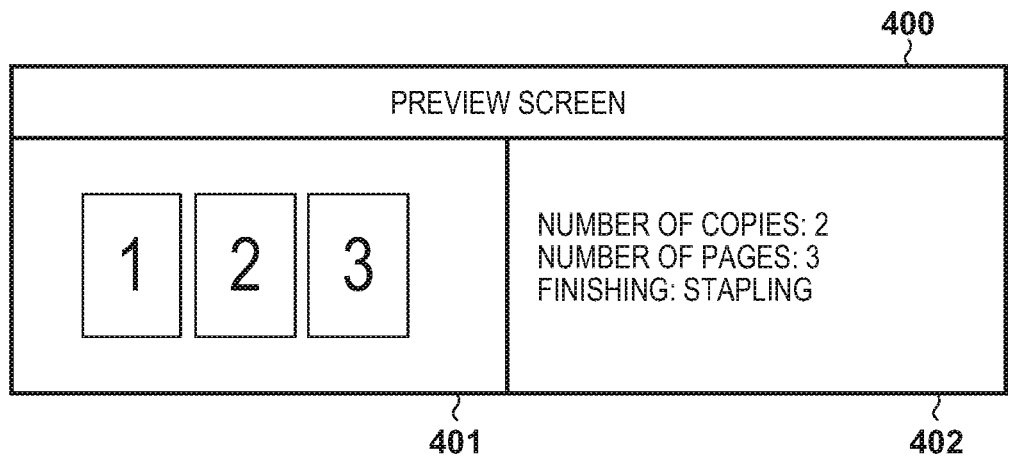
FIG. 4 is a view showing print contents displayed on a preview screen of an operation unit.

The arrangement of job data of the print job received by the printing apparatus 100 and the print contents displayed on the preview screen of the operation unit 109 will now be described with reference to FIGS. 3 and 4, respectively. FIG. 3 is a view for explaining the arrangement of job data 300 of the print job. The job data 300 can contain, for example, job settings 301 and PDL data 302. The job settings 301 can describe a print setting regarding an entire job, and can contain, for example, information, such as the number of copies, the number of pages in one set that should be subjected to finishing processing, and the type of the finishing processing. In the PDL data 302, data on a page of a print target is described in a PDL format. FIG. 4 is a view showing print contents 400 displayed on the preview screen of the operation unit 109. On the preview screen of the operation unit 109, for example, preview images of the respective pages in one copy can be displayed in an image display unit 401 on the left side, and the job settings analyzed in the job setting analysis unit 202 can be displayed in a setting display unit 402 on the right side.

When a plurality of copies of the pages of the print target are printed, copy processing is performed in the printing apparatus or in the host terminal. When the copy processing is performed in the host terminal, a plurality of pages are generated by the copy processing in the host terminal, and a print job for instructing to print the plurality of pages including a plurality of copies of one or more pages is transmitted from the host terminal to the printing apparatus. In the print job transmitted from the host terminal, however, for example, print contents, such as an image on each page in one copy, the number of pages in one copy, and the number of copies, may not be displayed on the preview screen correctly. That is, the print contents displayed on the preview screen and an actual print result may be different from each other.

Figure 5B:
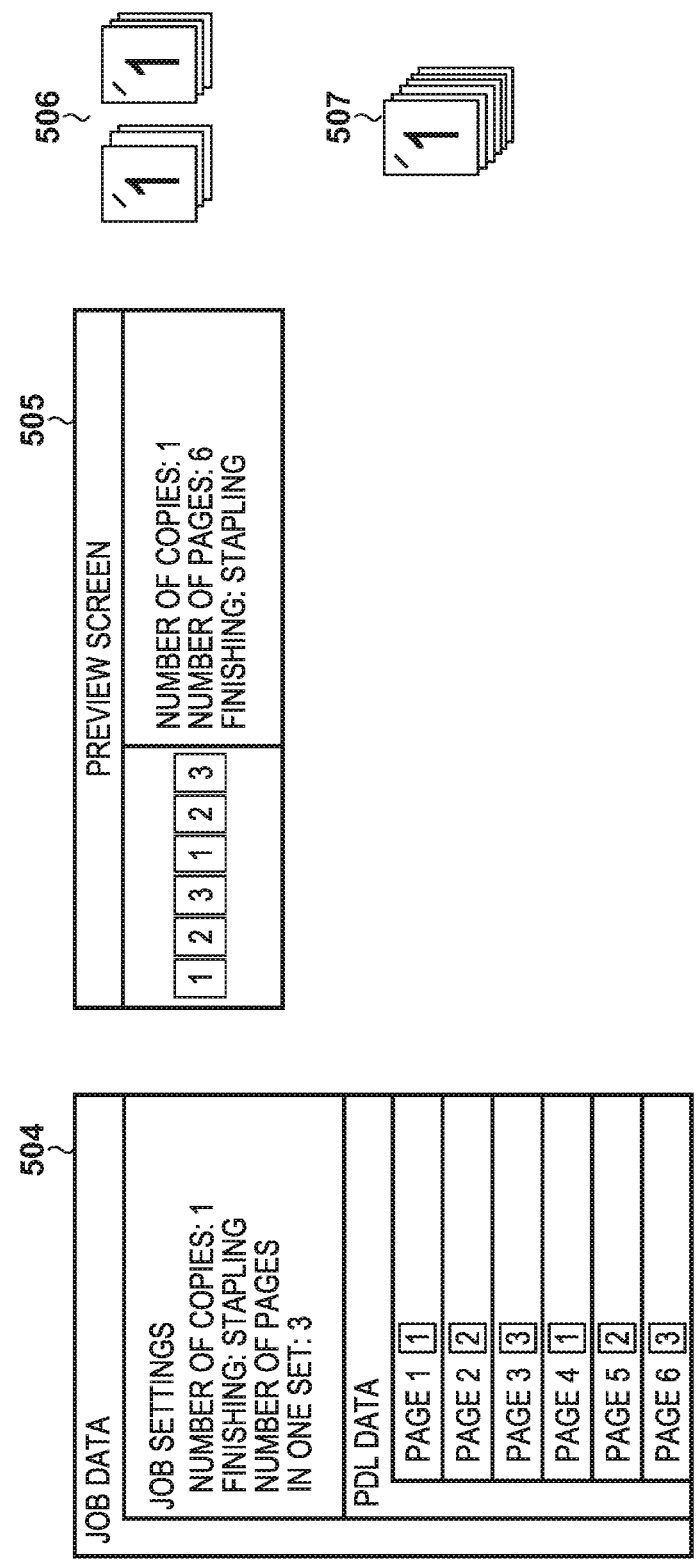
FIG. 5B shows views for explaining a general preview in a case in which a host terminal performs copy processing.

General previews in a case in which the copy processing is performed in the printing apparatus and in a case in which the copy processing is performed in the host terminal will now be described with reference to FIGS. 5A and 5B. In a description below, an example will be described in which two copies of document data with three pages are printed, and finishing processing (for example, stapling) is performed for every copy (one set).

First, the case will be described in which the copy processing is performed in the printing apparatus. FIG. 5A shows views showing job data 501, the print contents 502 displayed on the preview screen, and a print result 503 in the case in which the copy processing is performed in the printing apparatus 100. In this case, the job data 501 (print job) containing PDL data of three pages, and a job setting, with the number of copies being set to "2", is transmitted to the printing apparatus 100, as shown in the left view of FIG. 5A. In the general printing apparatus 100, the PDL data and the job settings in the received job data 501 are displayed on the preview screen without any change. Accordingly, preview images of three pages corresponding to one copy, and the job settings of "the number of copies: 2", "the number of pages: 3", and "finishing processing: stapling" can be shown in the print contents 502 displayed on the preview screen, as shown in the middle view of FIG. 5A. The printing apparatus 100 performs rendering of the PDL data in the PDL processing unit 203, copies two copies in the copy processing unit 208, and then outputs a result by performing staple processing for each copy. The right view of FIG. 5A shows the actual print result 503 output from the printing apparatus 100. In the case in which the copy processing is performed in the printing apparatus 100, as described above, it is possible to match the print contents 502 displayed on the preview screen and the actual print result 503 even if the PDL data and the job settings in the job data 501 are displayed on the preview screen without any change.

The case in which the copy processing is performed in the host terminal will now be described. FIG. 5B shows views showing job data 504, the print contents 505 displayed on the preview screen, and a print result 506 in the case in which the copy processing is performed in the host terminal. In this case, the job data 504 (print job) containing PDL data of six pages and a job setting with the number of copies being set to "1" can be transmitted to the printing apparatus 100, as shown in the left view of FIG. 5B. The number of pages in one set (the number of pages in one copy) that should be subjected to finishing processing can be set for the job data 504.

In the general printing apparatus 100, the PDL data and the job settings in the received job data 504 are displayed on the preview screen without any change, as described above. Accordingly, preview images of six pages corresponding to two copies, and the job settings of "the number of copies: 1", "the number of pages: 6", and "finishing processing: stapling" can be shown in the print contents 505 displayed on the preview screen, as shown in the middle view of FIG. 5B. Such a print result 506 displays a result 507 that the finishing processing (stapling) is performed with six pages constituting one set. In practice, however, the print result 506 of performing the finishing processing with three pages constituting one set is obtained because the number of pages in one set (one copy) that should be subjected to the finishing processing is set for the job data 504. As described above, in the case in which the copy processing is performed in the host terminal, the print contents 505 displayed on the preview screen and the actual print result 506 may be different from each other, that is, the print contents 505 may not be displayed on the preview screen correctly.

To address this problem, when the print job contains information indicating the number of pages in one set (the number of pages in one copy) that should be subjected to the finishing processing, the printing apparatus 100 of the first embodiment determines the number of copies based on the information and the number of pages of the plurality of pages in the PDL data. Then, the determined number of copies and the preview images of the respective pages in one copy are displayed as print contents on the preview screen. This allows the printing apparatus 100 to reduce the difference between the actual print result and the print contents displayed on the preview screen.

Figure 6:
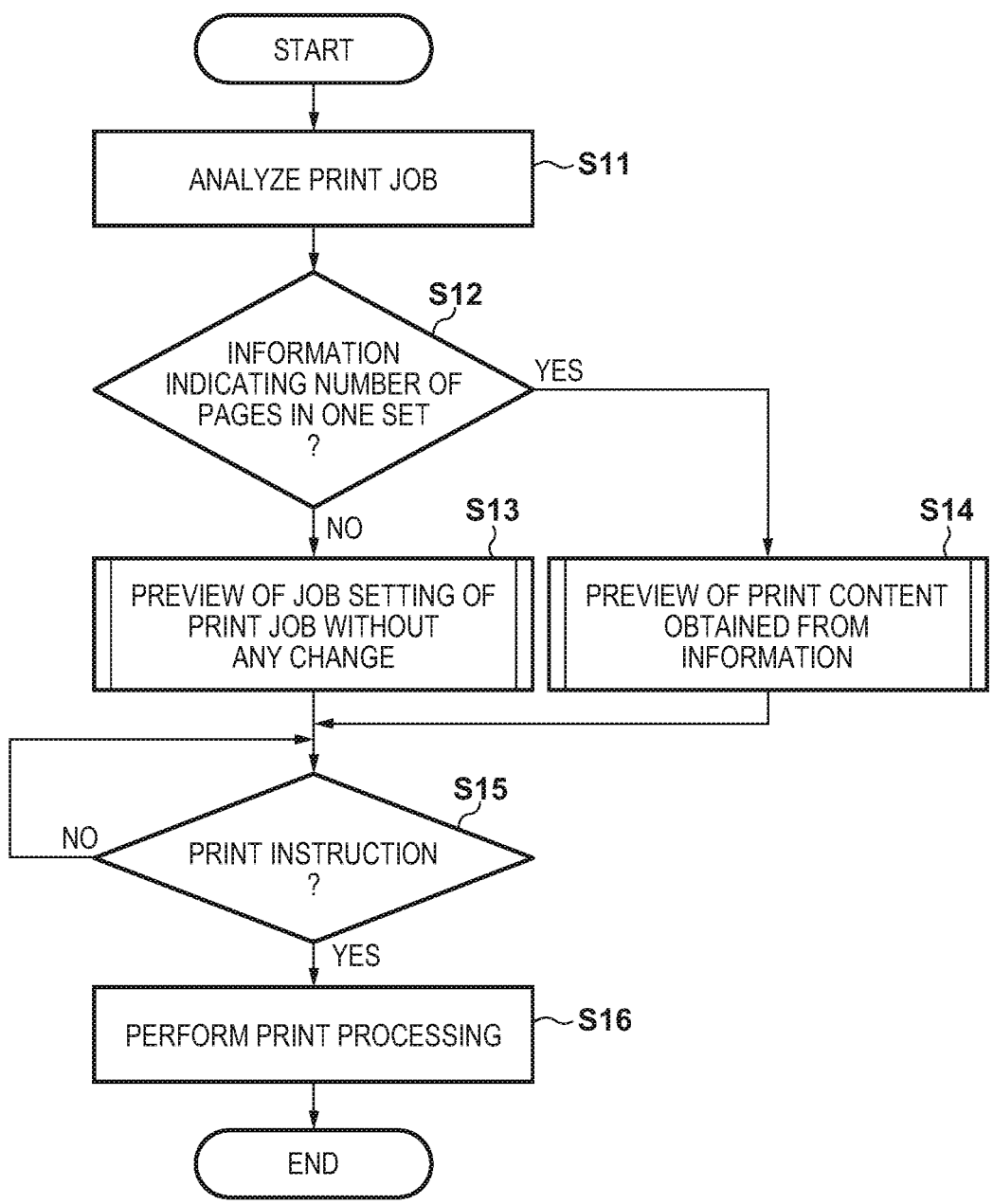
FIG. 6 is a flowchart showing a process executed in the printing apparatus according to an embodiment.

A process executed in the printing apparatus 100 of the first embodiment will be described below with reference to FIG. 6. FIG. 6 is a flowchart showing the process executed in the printing apparatus 100 of the first embodiment. Note that the process to be described below is implemented by causing the CPU 101 to load, in the RAM 103, the control programs stored in the HDD 104, the ROM 106, and the like, in advance, and to execute the programs.

In step S11, the printing apparatus 100 analyzes the received print job in the job setting analysis unit 202 and notifies the job management unit 207 of an analysis result. In step S12, the printing apparatus 100 judges, from the analysis result of the print job, whether the job settings contain information indicating the number of pages in one set (one copy). If the printing apparatus 100 judges that the job settings do not contain the information, the process advances to step S13.

Figure 7:
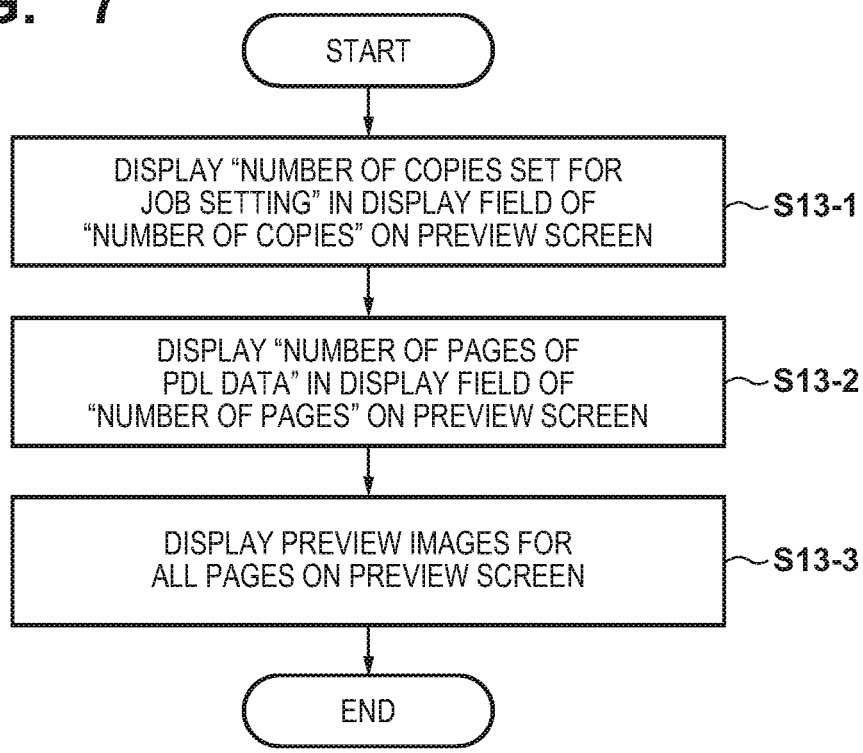
FIG. 7 is a flowchart showing steps of displaying print contents on a preview screen.

In step S13, the printing apparatus 100 (preview screen display unit 210) displays (previews), on the preview screen, the job settings of the received print job as the print contents without any change. The detailed steps of step S13 will now be described with reference to FIG. 7. FIG. 7 is a flowchart showing steps of previewing the job settings of the print job as the print contents without any change. Note that a process to be described below is implemented by causing the CPU 101 to load, in the RAM 103, the control programs stored in the HDD 104, the ROM 106, and the like, in advance, and to execute the programs.

In step S13-1, the preview screen display unit 210 displays, without any change, the number of copies set for the job setting of the print job (job data) in a display field of "the number of copies" on the preview screen. In step S13-2, the preview screen display unit 210 displays, without any change, the number of pages of the PDL data in the print job (job data) in a display field of "the number of pages" on the preview screen. In step S13-3, the preview screen display unit 210 displays, on the preview screen, the preview images generated in the preview image generation unit 209 for all pages of the PDL data in the print job.

Figure 8:
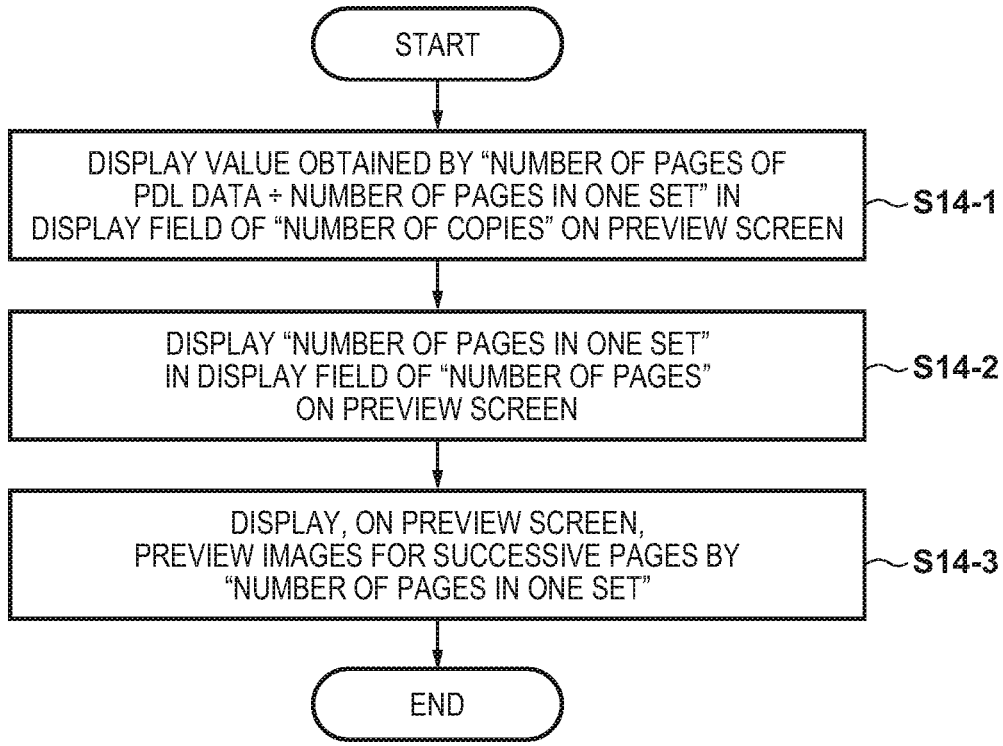
FIG. 8 is a flowchart showing steps of displaying print contents on the preview screen.

On the other hand, if the printing apparatus 100 judges in step S12 that the job settings contain the information indicating the number of pages in one set, the process advances to step S14. In step S14, the printing apparatus 100 (preview screen display unit 210) determines a print content, such as the number of copies, based on the information indicating the number of pages in one set, and displays the determined print content on the preview screen (previews the print content obtained from the information). The detailed steps of step S14 will now be described with reference to FIG. 8. FIG. 8 is a flowchart showing steps of previewing the print contents obtained based on the information indicating the number of pages in one set. Note that a process to be described below is implemented by causing the CPU 101 to load, in the RAM 103, the control programs stored in the HDD 104, the ROM 106, and the like, in advance, and to execute the programs.

In step S14-1, the preview screen display unit 210 obtains the number of pages of the PDL data contained in the print job (job data) and the number of pages in one set for the job setting. Then, the preview screen display unit 210 calculates "the number of pages of the PDL data÷the number of pages in one set" and displays an obtained value in a display field of "the number of copies" on the preview screen. In step S14-2, the preview screen display unit 210 obtains the number of pages in one set for the print job and displays the obtained number of pages in one set in a display field of "the number of pages" on the preview screen. In step S14-3, the preview screen display unit 210 extracts successive pages by the number of pages in one set out of the plurality of pages in the PDL data and displays, on the preview screen, preview images of the extracted pages as preview images of the respective pages in one copy.

Figure 9:
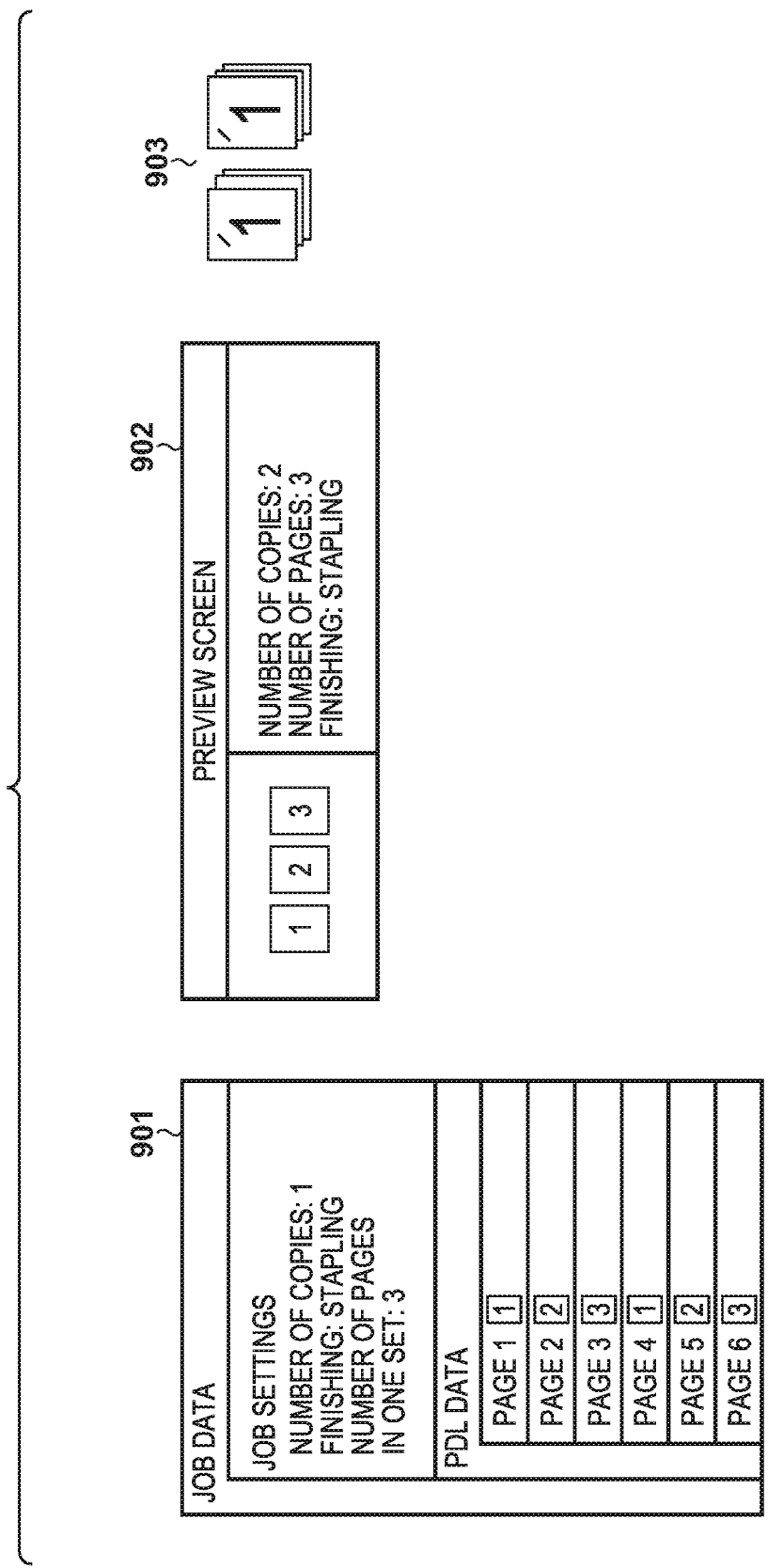
FIG. 9 shows views showing job data, print contents displayed on the preview screen, and a print result.

By performing steps S12 and S14 as described above, the print contents can be displayed on the preview screen correctly even in the case in which the copy processing is performed in the host terminal. For example, a case is assumed in which job data 901, which contains PDL data of six pages and a job setting with the number of copies being set to "1", is received as shown in the left view of FIG. 9. This job data 901 contains information indicating the number of pages in one set (one copy) that should perform finishing processing. In this case, the printing apparatus 100 of this embodiment can match, by going through step S14, print contents 902 displayed on the preview screen and an actual print result 903, as shown in the middle view and the right view of FIG. 9.

Referring back to the flowchart of FIG. 6, in step S15, the printing apparatus 100 waits for a print instruction from the user. For example, the user checks the print contents displayed on the preview screen by going through step S13 or S14 and supplies the print instruction to the printing apparatus 100 via the operation unit 109 if the print contents displayed on the preview screen match desired print contents. If the print instruction is supplied from the user, the process advances to step S16. In step S16, the printing apparatus 100 performs the print processing and the finishing processing by the printer engine 107, thereby terminating the print job.

Second Embodiment

A method of printing a plurality of copies of a page of a print target includes collation printing and group printing. For example, when M copies of N pages (one or more pages) are printed, collation printing refers to a printing method of repeating printing M times in the order of the first page, the second page, . . . , and the Nth page. On the other hand, group printing refers to a printing method of printing the first page M times, the second page M times, . . . , and the Nth page M times.

Figure 10:
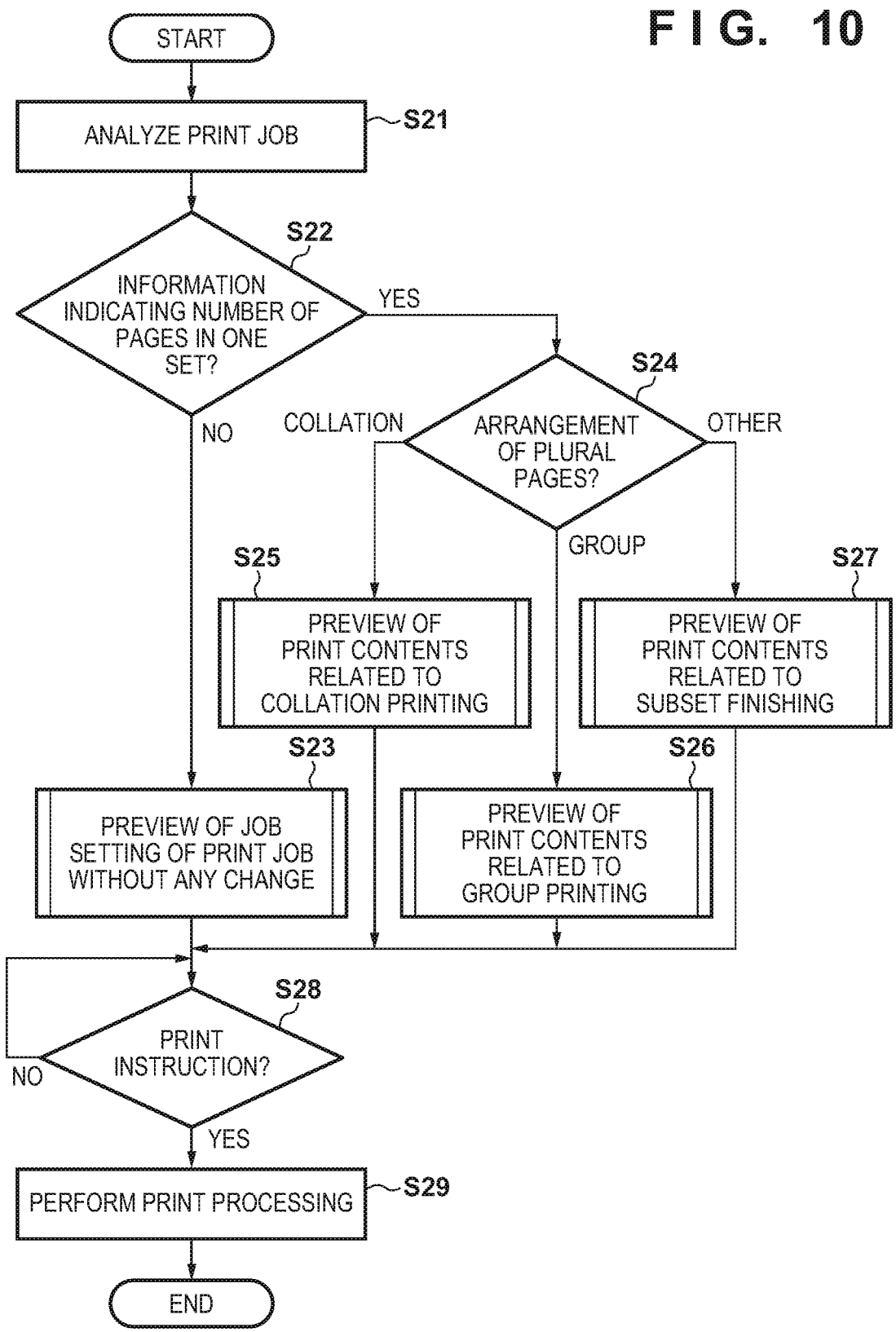
FIG. 10 is a flowchart showing a process executed in a printing apparatus according to an embodiment.

In the first embodiment, the case has been described in which the arrangement of the plurality of pages in the received print job is the arrangement for performing collation printing. The arrangement of the plurality of pages can, however, be the arrangement for performing group printing. Therefore, in the second embodiment, a page order judgment unit 211 judges the arrangement type of a plurality of pages in a received print job. Then, a method of extracting a page that should display a preview image on a preview screen is changed in accordance with the arrangement type of the plurality of pages judged by the page order judgment unit 211. FIG. 10 is a flowchart showing a process executed in a printing apparatus 100 according to the second embodiment. Steps S21 to S23 of FIG. 10 are the same as steps S11 to S13 of FIG. 6, and thus, a description thereof will be omitted here. Note that a process to be described below is implemented by causing a CPU 101 to load, in a RAM 103, control programs stored in an HDD 104, a ROM 106, and the like, in advance, and to execute the programs.

In step S24, the printing apparatus 100 judges, in the page order judgment unit 211, the arrangement type of a plurality of pages in PDL data. More specifically, the page order judgment unit 211 judges whether the arrangement of the plurality of pages in the PDL data is the arrangement for performing collation printing, the arrangement for performing group printing, or the arrangement for performing another type of printing. For example, the page order judgment unit 211 may judge the arrangement type by comparing stream data of the plurality of respective pages or by comparing thumbnail images of the plurality of respective pages.

If the printing apparatus 100 judges, in step S24, that the arrangement of the plurality of pages in the PDL data is the arrangement for performing collation printing (to be referred to as "collation" in FIG. 10), the process advances to step S25. In step S25, the printing apparatus 100 (preview screen display unit 210) displays print contents related to collation printing on the preview screen in accordance with the flowchart of FIG. 8 described above.

Figure 11:
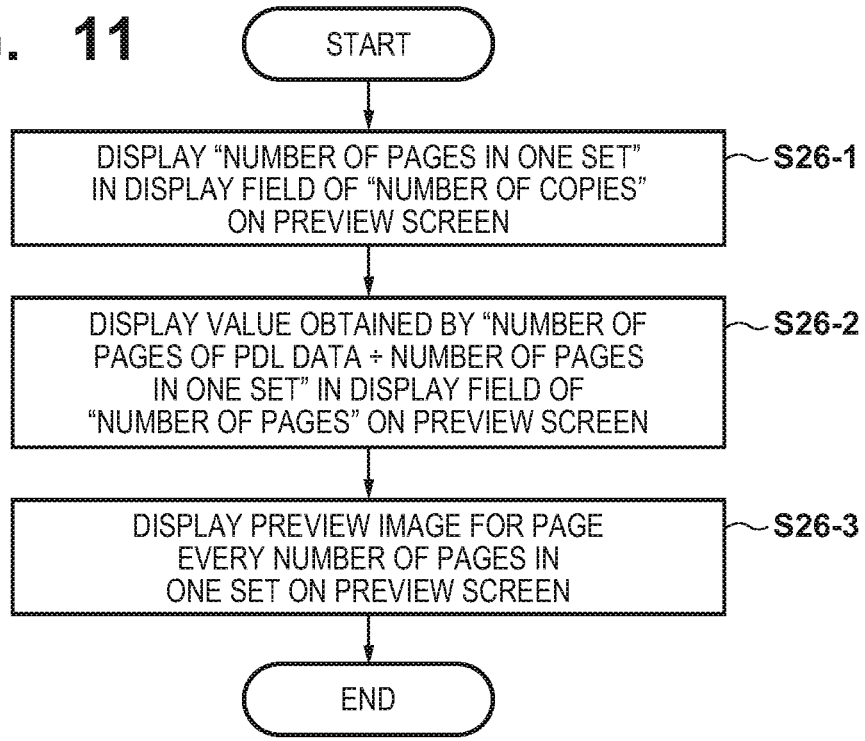
FIG. 11 is a flowchart showing steps of previewing print contents related to group printing.

If the printing apparatus 100 judges in step S24 that the arrangement of the plurality of pages in the PDL data is the arrangement for performing group printing (to be referred to as "group" in FIG. 10), the process advances to step S26. In step S26, the printing apparatus 100 (preview screen display unit 210) displays print contents related to the group printing on the preview screen in accordance with a flowchart of FIG. 11. FIG. 11 is the flowchart showing steps of previewing the print contents related to group printing. Note that the process to be described below is implemented by causing the CPU 101 to load, in the RAM 103, the control programs stored in the HDD 104, the ROM 106, and the like, in advance, and to execute the programs.

In step S26-1, the preview screen display unit 210 obtains the number of pages in one set in a print job (job data) and displays the obtained number of pages in one set in a display field of "the number of copies" on the preview screen. In step S26-2, the preview screen display unit 210 obtains the number of pages of the PDL data included in the print job and the number of pages in one set for a job setting. Then, the preview screen display unit 210 calculates "the number of pages of the PDL data÷the number of pages in one set" and displays an obtained value in a display field of "the number of pages" on the preview screen. In step S26-3, the preview screen display unit 210 extracts pages for every number of pages in one set, out of the plurality of pages in the PDL data, and displays, on the preview screen, preview images of the extracted pages as preview images of the respective pages in one copy.

For example, a case is assumed in which job data 1301, which contains PDL data of six pages arranged such that group printing is performed and a job setting with the number of copies being set to "1", is received as shown in the left view of FIG. 13A. This job data 1301 contains information indicating the number of pages in one set that should be subjected to finishing processing. In this case, the printing apparatus 100 of this embodiment can match, by going through step S26, print contents 1302 displayed on the preview screen and an actual print result 1303, as shown in the middle view and the right view of FIG. 13A.

Figure 12:
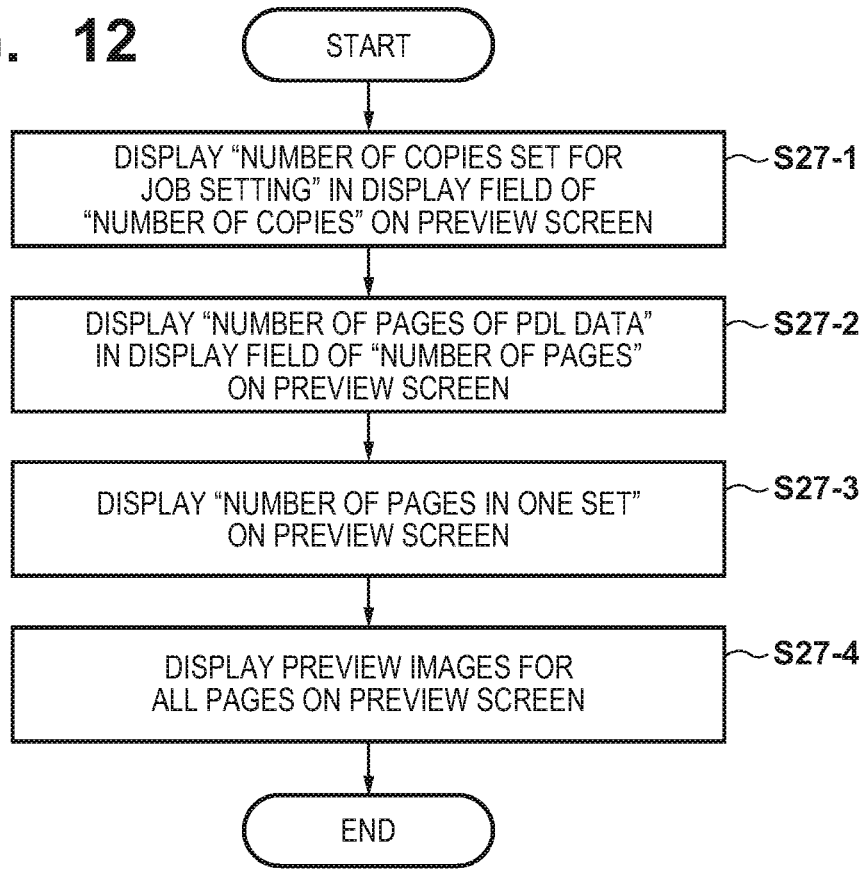
FIG. 12 is a flowchart showing steps of previewing print contents related to subset finishing.

If the printing apparatus 100 judges in step S24 that the arrangement of the plurality of pages in the PDL data is neither the arrangement for collation printing nor the arrangement for group printing (in the case of subset finishing), the process advances to step S27. In step S27, the preview screen display unit 210 of the printing apparatus 100 displays print contents related to subset finishing on the preview screen in accordance with a flowchart of FIG. 12. FIG. 12 is the flowchart showing steps of previewing the print contents related to subset finishing. Note that a process to be described below is implemented by causing the CPU 101 to load, in the RAM 103, the control programs stored in the HDD 104, the ROM 106, and the like, in advance, and to execute the programs.

In step S27-1, the preview screen display unit 210 displays, without any change, the number of copies set for the job setting of the print job (job data) in the display field of "the number of copies" on the preview screen. In step S27-2, the preview screen display unit 210 displays, without any change, the number of pages of the PDL data in the print job (job data) in the display field of "the number of pages" on the preview screen. In step S27-3, the preview screen display unit 210 obtains the number of pages in one set for the job setting of the print job, and displays the obtained number of pages in one set on the preview screen (the display of "every three pages" in the middle view of FIG. 13B). This aims at clearly demonstrating, to a user, that finishing processing (for example, stapling) is performed for every number of pages in one set. In step S27-4, the preview screen display unit 210 displays, on the preview screen, preview images generated in a preview image generation unit 209 for all pages of the PDL data in the print job.

Figure 13B:
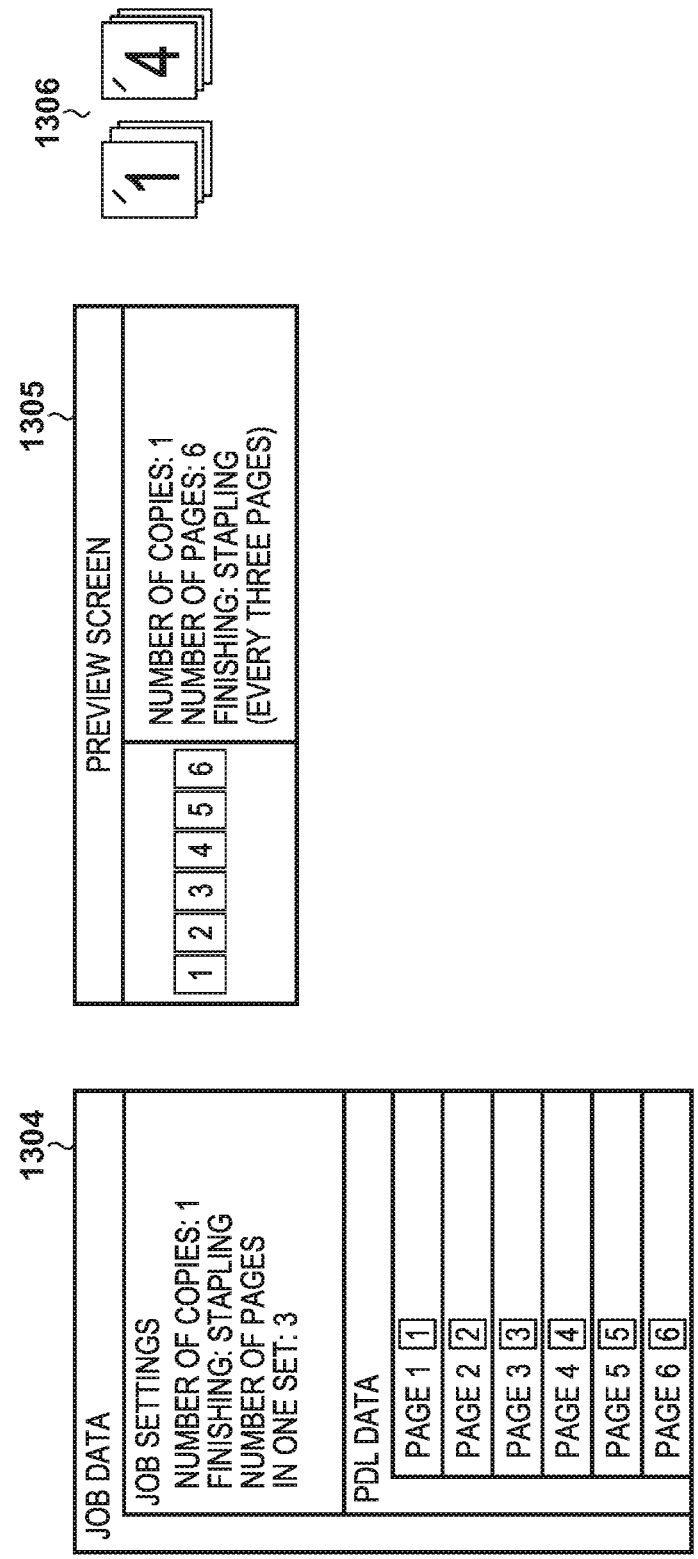
FIG. 13B shows views showing job data, print contents displayed on the preview screen, and a print result.

For example, a case is assumed in which job data 1304, which contains PDL data of six pages different from each other and a job setting with the number of copies being set to "1", is received, as shown in the left view of FIG. 13B. This job data 1304 contains information indicating the number of pages in one set that should perform finishing processing. In this case, in the printing apparatus 100 of this embodiment, print contents 1305, shown in the middle view of FIG. 13B, are displayed on the preview screen, and finishing processing (stapling) is performed for every three pages, as shown in the right view of FIG. 13B. That is, it is possible to match the print contents 1305 displayed on the preview screen and an actual print result 1306.

Referring back to the flowchart of FIG. 10, in step S28, the printing apparatus 100 waits for a print instruction from the user. For example, the user checks the print contents displayed on the preview screen and supplies the print instruction to the printing apparatus 100 via the operation unit 109 if the print contents displayed on the preview screen match desired print contents. If the print instruction is supplied from the user, the process advances to step S29. In step S29, the printing apparatus 100 performs print processing and finishing processing by a printer engine 107, thereby terminating the print job.

Third Embodiment

If the arrangement of a plurality of pages in PDL data is the arrangement for performing collation printing or group printing, it is preferable that rendering is performed on only respective pages in one copy, and a printing apparatus 100 performs copy processing on the pages that have been subjected to rendering. This is because a print speed can further be improved than by performing rendering on all of a plurality of pages generated by copy processing in a host terminal. Print processing according to step S29 of FIG. 10 will be described below with reference to FIG. 14. FIG. 14 is a flowchart showing the print processing. Note that the printing apparatus 100 has an ability of performing copy processing on a page of a print target. Also note that a process to be described below is implemented by causing a CPU 101 to load, in a RAM 103, control programs stored in an HDD 104, a ROM 106, and the like, in advance, and to execute the programs.

In step S29-1, the printing apparatus 100 judges whether the arrangement of the plurality of pages in the PDL data of a received print job is the arrangement for performing collation printing, the arrangement for performing group printing, or the arrangement for performing another type of printing. For example, the printing apparatus 100 may refer to the judgment result in step S24 of FIG. 10 in judging the arrangement type of the plurality of pages.

If the printing apparatus 100 judges, in step S29-1, that the arrangement of the plurality of pages in the PDL data is the arrangement for collation printing, the process advances to step S29-2. In step S29-2, the printing apparatus 100 performs rendering on the pages extracted in step S25 (step S14-3) described above. Note that the printing apparatus 100 may extract again, based on information indicating the number of pages in one set without using the pages extracted in step S25, successive pages by the number of pages in one set, out of the plurality of pages in the PDL data. In step S29-3, the printing apparatus 100 copies the pages that have been subjected to rendering by the number of copies, and performs print processing. Note that "the number of copies" indicates a value calculated by "the number of pages of the PDL data÷the number of pages in one set" in step S25 (step S14-1) described above.

On the other hand, if the printing apparatus 100 judges in step S29-1 that the arrangement of the plurality of pages in the PDL data is the arrangement for group printing, the process advances to step S29-4. In step S29-4, the printing apparatus 100 performs rendering on the pages extracted in step S26 (step S26-3) described above. Note that the printing apparatus 100 may extract again, based on the information indicating the number of pages in one set without using the pages extracted in step S26, pages for every number of pages in one set, out of the plurality of pages in the PDL data. In step S29-5, the printing apparatus 100 copies the pages that have been subjected to rendering by the number of copies, and performs print processing. Note that "the number of copies" indicates "the number of pages in one set".

If the printing apparatus 100 judges, in step S29-1, that the arrangement of the plurality of pages in the PDL data is neither the arrangement for collation printing nor the arrangement for group printing, the process advances to step S29-6. In step S29-6, the printing apparatus performs rendering on all of the plurality of pages in the PDL data. Then, in step S29-7, the printing apparatus 100 performs print processing on the pages that have been subjected to rendering.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

I claim:

1. A printing apparatus that communicates with an information processing apparatus, the printing apparatus comprising:
   a display; and
   a controller including a processor, wherein the controller is configured to:
   receive, from the information processing apparatus, a print job including a plurality of sets of image data, wherein each set is corresponding to one copy and a number of the sets is corresponding to a number of copies set by a user operating the information processing apparatus;
   receive, from the information processing apparatus, a number of pages per set;
   obtain a number of copies based on a number of total pages in all of the plurality of sets of image data included in the print job and the received number of pages per set;
   determine an arrangement type of pages in all of the plurality of sets of image data included in the print job;
   in a case where the determined arrangement type is a first type, generate first preview images based on the image data that has been received continuously and corresponds to one set without generating preview images corresponding to an other set included in the received print job, wherein the one set is to be used for printing and the other set included in the print job is not to be used for printing, and cause the display to display the number of copies and the generated first preview images; and
   in a case where the determined arrangement type is a second type, generate second preview images based on the image data that has not been received continuously and corresponds to the one set, and cause the display to display the number of copies and the generated second preview images, wherein
   the first type corresponds to an arrangement for performing collation printing, and the second type corresponds to an arrangement for performing group printing.

2. The printing apparatus according to claim 1, wherein the display displays the number of pages per set, in addition to the number of copies.

3. The printing apparatus according to claim 1, wherein the controller is configured to:
   in a case where the number of pages per set has been received, cause the display to display the number of copies based on the number of total pages in all of the plurality of sets of image data included in the print job and the received number of pages per set,
   in a case where the number of pages per set has not been received, cause the display to display a number of copies received from the information processing apparatus.

4. The printing apparatus according to claim 1, wherein the arrangement type of the plurality of pages is determined by comparing data of continuous pages among the plurality of pages.

5. The printing apparatus according to claim 1, wherein the controller is further configured to cause the display to display, as the number of copies, a number determined by dividing the number of the total pages in all of the plurality of sets of image data included in the received print job by the number of pages per set.

6. The printing apparatus according to claim 1, wherein the controller is further configured to cause, in a case that the number of pages per set has not been received, the display to display review images based on whole image data included in the received print job.

7. The printing apparatus according to claim 1, wherein the controller is further configured to:
   execute image rendering corresponding to the one copy based on image data selected based on the received number of pages per set from all of the plurality of sets of image data included in the received print job, without executing image rendering corresponding to the other copy included in the received print job.

8. The printing apparatus according to claim 7, wherein the controller is further configured to duplicate the image generated by the image rendering so as to output the number of copies of the image corresponding to one set.

9. A control method of controlling a printing apparatus that communicates with an information processing apparatus, the method comprising:
   receiving, from the information processing apparatus, a print job including a plurality of sets of image data, wherein each set is corresponding to one copy and a number of the sets is corresponding to a number of copies set by a user operating the information processing apparatus;
   receiving, from the information processing apparatus, a number of pages per set;
   obtaining a number of copies based on a number of total pages in all of the plurality of sets of image data included in the print job and the received number of pages per set;
   determining an arrangement type of pages in all of the plurality of sets of image data included in the print job;
   in a case where the determined arrangement type is a first type, generating first preview images based on the image data that has been received continuously and corresponds to one set without generating preview images corresponding to an other set included in the received print job, wherein the one set is to be used for printing and the other set included in the print job is not to be used for printing, and displaying the number of copies and the generated first preview images; and
   in a case where the determined arrangement type is a second type, generating second preview images based on the image data that has not been received continuously and corresponds to the one set, and displaying the number of copies and the generated second preview images, wherein
   the first type corresponds to an arrangement for performing collation printing, and the second type corresponds to an arrangement for performing group printing.

10. A non-transitory computer-readable storage medium storing a program for causing a computer to execute each step of a control method of a controlling printing apparatus that communicates with an information processing apparatus, the method comprising steps of:
    receiving, from the information processing apparatus, a print job including a plurality of sets of image data, wherein each set is corresponding to one copy and a number of the sets is corresponding to a number of copies set by a user operating the information processing apparatus;
    receiving, from the information processing apparatus, a number of pages per set;

obtaining a number of copies based on a number of total pages in all of the plurality of sets of image data included in the print job and the received number of pages per set;

determining an arrangement type of pages in all of the plurality of sets of image data included in the print job;

in a case where the determined arrangement type is first type, generating first preview images based on the image data that has been received continuously and corresponds to one set without generating preview images corresponding to an other set included in the received print job, wherein the one set is to be used for printing and the other set included in the print job is not to be used for printing, and displaying the number of copies and the generated first preview images; and in a case where the determined arrangement type is a second type, generating second preview images based on the image data that has not been received continuously and corresponds to the one set, and displaying the number of copies and the generated second preview images, wherein the first type corresponds to an arrangement for performing collation printing, and the second type corresponds to an arrangement for performing group printing.

* * * * *